(12) United States Patent
Kim (10) Patent No.: US 9,003,646 B2
(45) Date of Patent: Apr. 14, 2015

(54) ROLLER HEMMING SYSTEM FOR PANEL OF VEHICLE

(75) Inventor: Ki Soon Kim, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 458 days.

(21) Appl. No.: 13/491,975

(22) Filed: Jun. 8, 2012

(65) Prior Publication Data

US 2013/0091699 A1    Apr. 18, 2013

(30) Foreign Application Priority Data

Oct. 13, 2011 (KR) .......................... 10-2011-0104652

(51) Int. Cl.
| | |
|---|---|
| B23P 21/00 | (2006.01) |
| B21D 19/04 | (2006.01) |
| B25B 11/02 | (2006.01) |
| B25J 9/00 | (2006.01) |
| B21D 39/02 | (2006.01) |
| B62D 65/02 | (2006.01) |

(52) U.S. Cl.
CPC ............... *B21D 19/04* (2013.01); *B23P 21/004* (2013.01); *B25B 11/02* (2013.01); *B23P 2700/50* (2013.01); *B62D 65/026* (2013.01); *B25J 9/0084* (2013.01); *B21D 39/021* (2013.01)

(58) Field of Classification Search
CPC .......... B25B 5/006; B25B 11/02; B23Q 3/06; B23P 19/00; B23P 21/008; B23P 21/004; B23P 2700/50; B62D 65/026; B25J 9/0093; B25J 9/0096
USPC ........ 29/897.2, 429, 430, 431, 559, 787, 791, 29/795, 799, 822, 823, 824, 464, 281.1, 29/281.3; 269/55.37, 289 R, 60
See application file for complete search history.

(56) References Cited

U.S. PATENT DOCUMENTS

| | | | | | |
|---|---|---|---|---|---|
| 4,960,969 | A | * | 10/1990 | Shigenaka | ................... 219/91.2 |
| 4,960,974 | A | * | 10/1990 | Shigenaka | ................ 219/137 R |
| 5,265,317 | A | * | 11/1993 | Angel | .............................. 29/429 |

FOREIGN PATENT DOCUMENTS

| | | | | |
|---|---|---|---|---|
| FR | 2728186 A1 * | 6/1996 | ............. | B23Q 41/06 |
| JP | 02006022 A | 1/1990 | | |
| JP | 2000263157 A | 9/2000 | | |
| KR | 1020060108868 A | 10/2006 | | |
| KR | 10-2010-0093970 | 8/2010 | | |
| KR | 1020100112437 A | 10/2010 | | |
| KR | 10-2011-0028128 | 3/2011 | | |
| WO | WO 2008062033 A1 * | 5/2008 | ............. | B23P 21/00 |
| WO | WO 2009098285 A1 * | 8/2009 | | |

* cited by examiner

*Primary Examiner* — Jermie Cozart
(74) *Attorney, Agent, or Firm* — Mintz Levin Cohn Ferris Glovsky and Popeo, P.C.; Peter F. Corless (57) ABSTRACT

Disclosed is a roller hemming system for panels of a vehicle that may include: a marriage jig adapted to load thereon a part having an outer panel and an inner panel joined together; a clamping pad releasably mounted at a front end of an arm of a first handling robot, and adapted to clamp the part loaded on the marriage jig by a plurality of clamping means; a plurality of transfer rails adapted to intersect with each other at a center; a plurality of hemming dies, each being disposed on a predetermined transfer rail, being adapted to reciprocate on the transfer rail between the center and an initial position, and being adapted to receive thereon the part clamped by the clamping pad; and a plurality of hemming robots being disposed corresponding to each hemming die and provided with a hemming roller unit adapted to hem an edge of the part.

13 Claims, 10 Drawing Sheets

ROLLER HEMMING SYSTEM FOR PANEL OF VEHICLE

CROSS-REFERENCE TO RELATED APPLICATION

This application claims priority to and the benefit of Korean Patent Application No. 10-2011-0104652 filed in the Korean Intellectual Property Office on Oct. 13, 2011, the entire contents of which are incorporated herein by reference.

BACKGROUND OF THE INVENTION (a) Field of the Invention

The present invention relates to a roller hemming system for panels of a vehicle. More particularly, the present invention relates to a roller hemming system for panels of a vehicle that is particularly adapted to hem parts such as a tail gate and a hood of the vehicle.

(b) Description of the Related Art

In a typical first stage of a vehicle manufacturing process, various vehicle panels are manufactured using a press apparatus, and the panels are transmitted to a vehicle body factory. At the vehicle body factory, the panels are assembled to form a vehicle body of a body in white (B.I.W) shape.

After the panels of the vehicle body are formed to have a predetermined shape through various press apparatus by application of pressure, the panels are cut, drilled, bent, and/or curved using press processes such as trimming, piercing, flanging, hemming, and so on.

In addition, edges of a door, a hood, a trunk, a wheel arch, or a fender of a vehicle are hemmed, and a welding surface is secured at a regional part and is welded through face welding so as to reinforce joining strength of hemming.

During a hemming process, edges of an inner panel are flanged and clinched inwardly, and a hemming sealer is sprayed into a gap formed during clinching. This hemming process is performed while the inner panel is fitted in an outer panel. At this time, the hemming sealer is heated and hardened through a painting process so that it functions as glue.

According to a conventional hemming process, after a mold corresponding to a panel is mounted at a press type device, and the outer panel and the inner panel are inserted in the mold, a press mold is moved downwardly so as to fold an end portion of the panels and join the panels.

Because an expensive mold having a shape similar to the panels must be manufactured in this process, an initial plant and equipment investment may be very large. In addition, because the size of such a press body is very big, designing the equipment layout in a factory is very difficult.

In a case of a mass-production line which produces various vehicle models, the hemming process should be performed after the molds are replaced depending on the vehicle model being produced. Therefore, much time and effort is required to replacing the molds and productivity may be deteriorated.

So as to solve such problems, a roller hemming method using a robot is mainly used. However, mass production of various vehicle models is difficult, equipment for transferring, loading, and clamping the panels is very complex, working hours are long, and the initial investment increases according to the roller hemming method.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a roller hemming system for panels of a vehicle that is capable of hemming inner and outer panels (hereinafter, an outer panel and an inner panel may together be referred to as a "part" of various vehicle models having different specifications, with high speed, through a roller hemming process using a robot. It is noted that reference to "various vehicle models" herein refers to any variety of vehicle models having different specifications from each other.

In one aspect, the present invention provides a roller hemming system for panels of a vehicle that may include: a marriage jig adapted to load thereon a part comprising an outer panel and an inner panel joined together; a clamping pad releasably mounted at a front end of an arm of a first handling robot, and adapted to clamp the part loaded on the marriage jig by a plurality of clamping means; a plurality of transfer rails adapted to intersect with each other at a center location; a plurality of hemming dies, each hemming die being disposed on a predetermined transfer rail corresponding to the part of various vehicle models, the hemming dies each being adapted to reciprocate on its respective transfer rail between the center location and an initial position, and adapted to receive thereon the part clamped by the clamping pad; and a plurality of hemming robots, each hemming robot being disposed so as to correspond to a hemming die and being provided with a hemming roller unit adapted to hem an edge of the part.

According to various embodiments, the roller hemming system may further include a loading jig adapted to load the part thereon by a second handling robot, after the part has been hemmed by the hemming roller unit of the hemming robot.

According to various embodiments, the roller hemming system may further include a plurality of loading dies, each loading die being adapted to load thereon the clamping pad corresponding to the vehicle parts of various vehicle models.

According to various embodiments, the roller hemming system may further include a hemming die exchanging unit for exchanging the hemming dies corresponding to the vehicle parts of various vehicle models.

According to various embodiments, the hemming die may include: a base members movably mounted on the plurality of transfer rails; and a die main body mounted on each if the base members.

According to various embodiments, when the part is a tail gate, a pair of first pin clampers for clamping the clamping pad may be mounted at the die main body.

According to various embodiments, when the part is a hood, a pair of second pin clampers for clamping the clamping pad may be mounted on the base member.

According to various embodiments, the roller hemming system may further include a plurality of auxiliary clamping means mounted on the base member and adapted to clamp the part loaded on the die main body temporarily so as to properly position the part (e.g. to position the part upright or in any other desired position).

According to various embodiments, the roller hemming system may further include a plurality of hemming punches mounted on the base member. The hemming punches may be adapted to hem a portion, such as a corner portion, of the part.

According to various embodiments, the roller hemming system may further include a pressing unit adapted to press the part down when an edge of the part (e.g. hood, tail gate, etc) is hemmed.

According to various embodiments, the pressing unit may include: a post mounted vertically and extending toward the center of the transfer rail; an operating cylinder mounted to extend downward at an end of the post toward the center of the transfer rail, the operating cylinder being provided with an operating rod movably mounted on the operating cylinder; and a pressing pad mounted at the operating rod of the operating cylinder and being adapted to press the part down.

According to various embodiments, the roller hemming system may further include a plurality of suction units mounted on the clamping pad and the hemming die. The suction units may be adapted to hold the part by using vacuum pressure.

According to various embodiments, the hemming roller unit may include: a preceding roller adapted to pre-hem the edge of the part; and a following roller mounted in a corresponding manner with the preceding roller. The following roller may be movable upward and/or downward and may be adapted to perform final hemming of the part's edge.

BRIEF DESCRIPTION OF THE DRAWINGS

The drawings illustrate exemplary embodiments of the present invention and are not construed to limit any aspect of the invention.

<Description of symbols>

| | |
|---|---|
| 1, 2: part | 10: marriage jig |
| 20, 120: clamping pad | 23: clamping means |
| 27: first pin clamper | 30: loading die |
| 40, 140: transfer rail | 50, 150: hemming die |
| 51, 151: base member | 52, 152: die main body |
| 55, 155: auxiliary clamping means | |
| 57: hemming punch | 60, 160: hemming robot |
| 70: hemming roller unit | 71: preceding roller |
| 72: following roller | 80: loading jig |
| 90: hemming die exchanging unit | |
| R1, R2, R3: handling robot | |
| 128: clamped end | 165: the second pin clamper |
| 210: pressing unit | 211: post |
| 221: operating cylinder | 225: pressing pad |
| 230: suction unit | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, size and thickness of components shown in the drawings may be different from the actual size and thickness of the components for better comprehension and ease of description. Therefore, the present invention is not limited to those shown in the drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
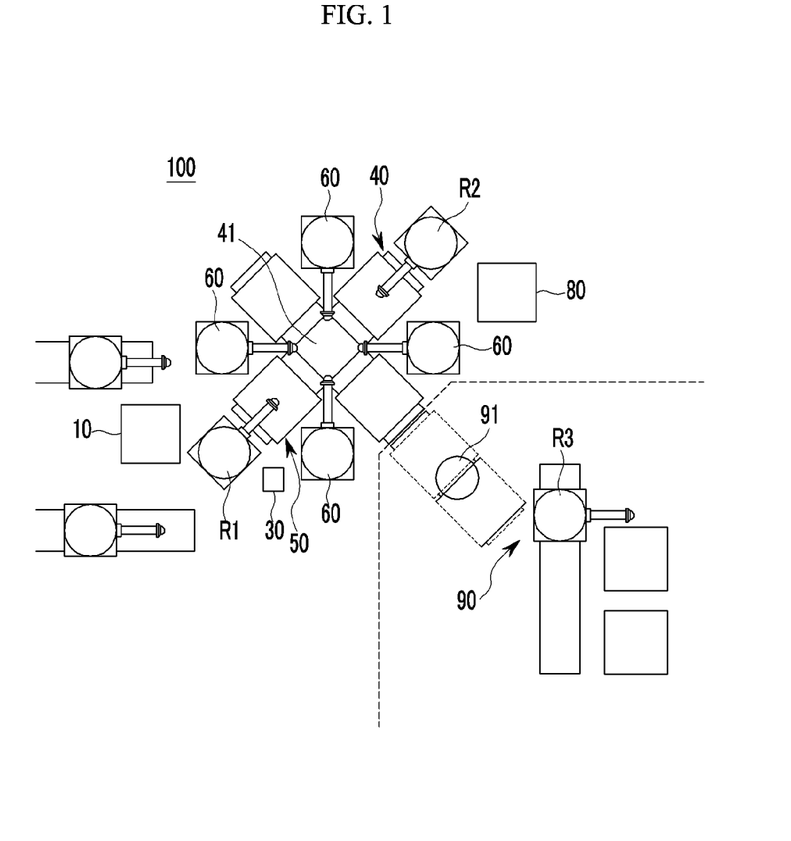
FIG. 1 is a block diagram of a roller hemming system for panels of a vehicle according to exemplary embodiments of the present invention.

FIG. 1 is a block diagram of a roller hemming system for panels of a vehicle according to exemplary embodiments of the present invention.

Referring to FIG. 1, a roller hemming system 100 for panels of a vehicle according to exemplary embodiments of the present invention can be applied to a panel forming process where panels (hereinafter, panels, such as an inner and outer panel, will be called a "part" for convenience) such as a tail gate and a hood are formed in a vehicle body assembly factory.

For example, the roller hemming system 100 for panels of a vehicle can be used in a roller hemming process where an edge of a part 1 (referring to FIG. 2) at which an outer panel and an inner panel are joined together is folded by a hemming roller so as to assemble the outer panel and the inner panel together.

Figure 2:
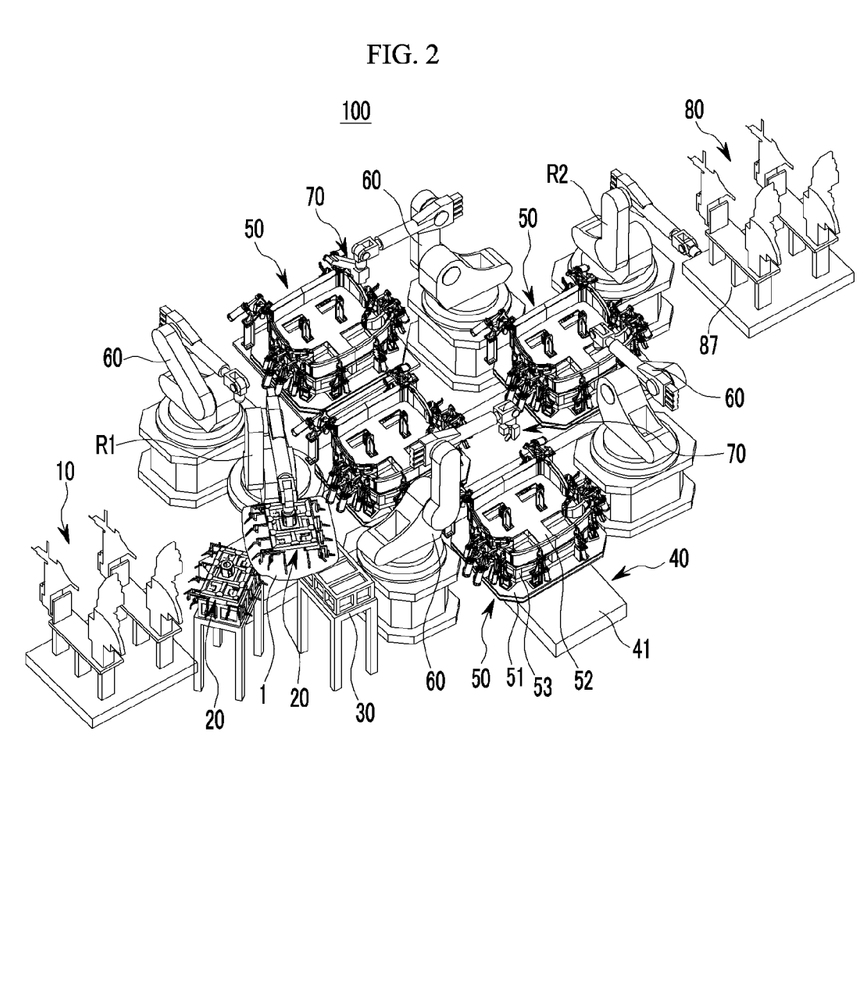
FIG. 2 is a schematic diagram of a roller hemming system for panels of a vehicle according to the first exemplary embodiment of the present invention.

In particular, the roller hemming system 100 is configured to fold a flange portion of the outer panel toward a front end of the inner panel by a hemming roller which moves along an edge portion of the outer panel and the inner panel of the part 1 so as to hem the edge portion of the part 1.

According to an exemplary embodiment, the roller hemming system 100 is applicable to a roller hemming process using a robot. Such a system can hem the parts of various vehicle models having different specification with high speed and, thus, can reduce investment costs because a specific roller hemming system is not required for each vehicle model.

FIG. 2 is a schematic diagram of a roller hemming system for panels of a vehicle according to the first exemplary embodiment of the present invention.

Referring to FIG. 1 and FIG. 2, the roller hemming system 100 basically includes a marriage jig 10, a clamping pad 20, a loading die 30, a transfer rail 40, a hemming die 50, a hemming robot 60, a loading jig 80, and a hemming die exchanging unit 90. Each of these components will be described in further detail.

According to the exemplary embodiment, the marriage jig 10 can be mounted on a ground of a workroom, and is adapted to load a part 1 which includes the outer panel and the inner panel joined together.

For example, a tail gate having an opening of a predetermined size will be shown as the part 1.

The marriage jig 10 may be an attachment device for positioning the parts 1 of various vehicle models, wherein the various vehicle model parts can have differing upright shapes.

A marriage jig 10 is well known to a person skilled in the art, and thus, a detailed description thereof will be omitted in this specification.

In an exemplary embodiment of the present invention, the clamping pad 20 is adapted to transfer the part 1 to the hemming die 50 using a first handling robot R1 which clamps the part 1 loaded on the marriage jig 10.

The clamping pad 20 is adaptable to all the parts 1 of various vehicle models having various shapes.

Figure 3:
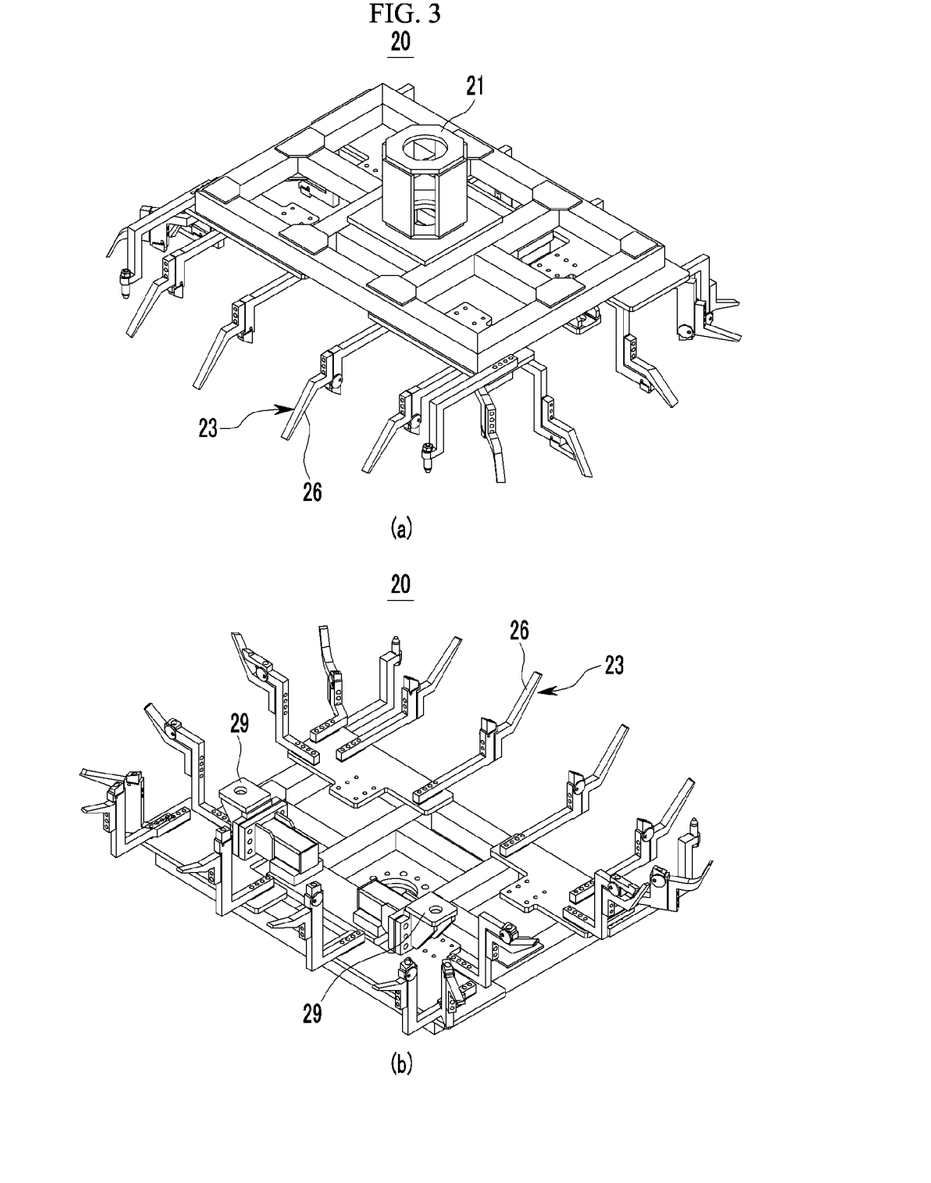
FIG. 3 is a perspective view of a clamping pad applicable to a roller hemming system for panels of a vehicle according to the first exemplary embodiment of the present invention.

FIG. 3 is a perspective view of a clamping pad applicable to a roller hemming system 100 according to the first exemplary embodiment of the present invention.

Referring to FIG. 2 and FIG. 3, the clamping pad 20 can be releasably mounted at a front end of an arm of the first handling robot R1 through a tool exchanger 21.

In addition, a plurality of clamping means 23 are provided at the clamping pad 20 for clamping the part 1 loaded on the marriage jig 10.

In particular, the clamping pad 20 clamps the part 1 through the clamping means 23 when the clamping pad 20 is coupled to the front end of the arm of the first handling robot R1 through the tool exchanger 21. In addition, the first handling robot R1 can transfer the part 1 clamped by the clamping means 23 to the hemming die 50.

The clamping pad 20 can be released from the front end of the arm of the first handling robot R1 as desired, such as when the part 1 clamped by the clamping means 23 has been loaded on the hemming die 50.

The clamping means 23 may be operated by a clamping cylinder (not shown) or the like, and can be provided with a clamper 26 that is configured and arranged for clamping an edge portion of the part 1.

In an exemplary embodiment of the present invention, the loading die 30, as shown in FIG. 1 and FIG. 2, is adapted to load thereon the clamping pad 20 corresponding to each part 1 of various vehicle models.

According to various embodiments, a supporting die, which simply supports the clamping pad 20, can be used as the loading die 30. A plurality of loading die 30 can be used and, for example, may be mounted on the ground of the workroom near the marriage jig 10.

In an exemplary embodiment of the present invention, the transfer rails 40, as shown in FIG. 1 and FIG. 2, are mounted on the ground of the workroom in a cross-like shape. As such, the transfer rails 40 may be adapted to move the hemming die 50 back and forth between a predetermined position and a center of the cross-like shape. As described herein, a plurality of transfer rails 40 are formed in the cross shape, but the mounting shape of the transfer rails is not limited to the cross shape. Generally, however, it is preferable that the plurality of transfer rails 40 intersect at a location.

The transfer rails 40 include a plurality of rail bases 41 having predetermined widths, wherein the rail bases 41 intersect to form a cross shape. A rail (not shown) is disposed on the rail base 41 so as to move the hemming die 50.

In an exemplary embodiment of the present invention, the hemming die 50, as shown in FIG. 1 and FIG. 2, may be a hemming jig for receiving the part 1 clamped by the clamping pad 20.

For example, each hemming die 50 may correspond to each part 1 of various vehicle models having different specifications. The hemming die 50 may be disposed on a predetermined transfer rail 40 among the plurality of transfer rails 40. In particular, the hemming die 50 are mounted on the transfer rails 40 so as to be movable between the center of the cross shape and an initial position.

In this embodiment, the hemming die 50 is coupled to the rail (not shown) of the transfer rail 40 and is adapted to move back and forth along the rail by a driving portion (not shown).

The driving portion may include a motor and a guider, which are well known to a person of an ordinary skill in the art. Therefore, a detailed description of the driving force will be omitted in this specification.

Figure 4:
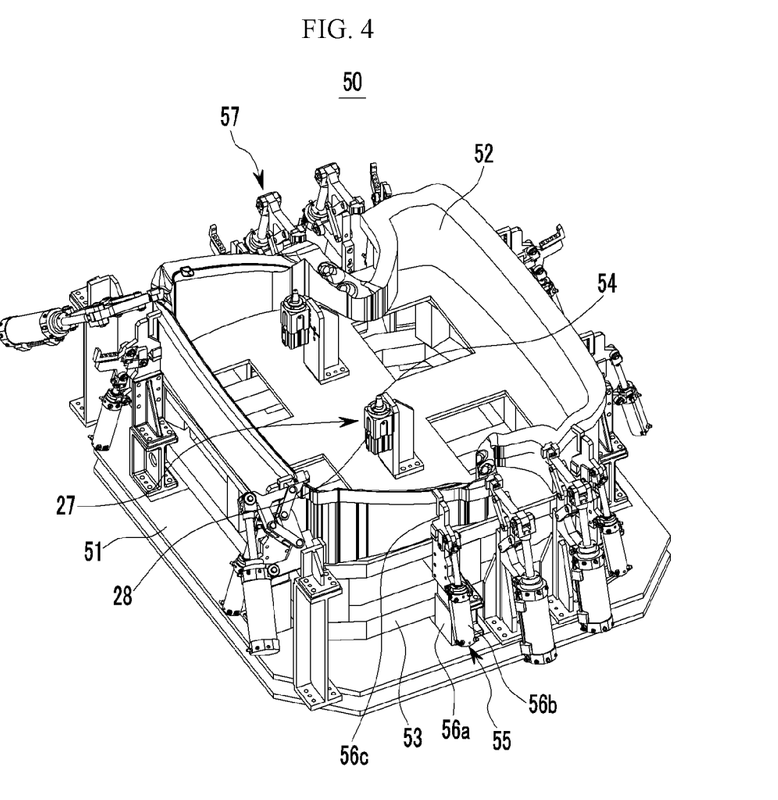
FIG. 4 is a perspective view of a hemming die applicable to a roller hemming system for panels of a vehicle according to the first exemplary embodiment of the present invention.

FIG. 4 is a perspective view of a hemming die applicable to a roller hemming system for panels of a vehicle according to the first exemplary embodiment of the present invention.

As shown in FIG. 2 and FIG. 4, the hemming die 50 includes a base member 51 movably mounted on the transfer rail 40 and a die main body 52 mounted on the base member 51.

The base member 51 is movably mounted on the rail base 41 of the transfer rail 40, and a supporting block 53 for supporting the die main body 52 is mounted on an upper surface of the base member 51.

In addition, the die main body 52 is mounted on the supporting block 53 of the base member 51. The die main body 52 is formed such that an upper edge of the die main body 52 can receive an edge of the part 1. In addition, a space is formed at a middle portion of an upper surface of the die main body 52.

In an exemplary embodiment of the present invention, a first pin clamper 27 for clamping the clamping pad 20 is mounted at the die main body 52. The first pin clamper is a locking means for fixing/locking the clamping pad 20.

The first pin clamper 27 is adapted to lock the part 1 when the part 1 is loaded on the hemming die 50 through the clamping pad 20.

As shown, the first pin clamper 27 may be provided with a clamping pin 54 movably mounted relative to the die main body 52 by the clamping cylinder 28. The clamping pin 54, as shown in FIG. 3B, is inserted in a clamping hole 29 formed at the clamping pad 20 so as to clamp the clamping pad 20.

The first pin clamper 27 may be a pin clamping apparatus or the like. Such a pin clamping apparatus is well known to a person of an ordinary skill in the art, and thus a detailed description thereof will be omitted in this specification.

As further shown, a plurality of auxiliary clamping means 55 may be mounted on the base member 51. The auxiliary clamping means 55 are adapted to clamp the part 1 loaded on the die main body 52 temporarily and to position the part 1 on the die main body 52 in an upright position.

As shown, the auxiliary clamping means 55 is mounted on an upper surface of the base member 51 and extends toward edges of the die main body 52.

When an auxiliary cylinder 56b mounted through a first mounting body 56a operates an auxiliary clamper 56c, the auxiliary clamping means 55 clamps an edge portion of the part 1 loaded on the die main body 52 temporarily by means of the auxiliary clamper 56c.

In addition, a plurality of hemming punches 57 may be mounted on the base member 51. The hemming punches 57 are adapted to hem a corner portion of the part 1 when it is loaded on the die main body 52.

Figure 5:
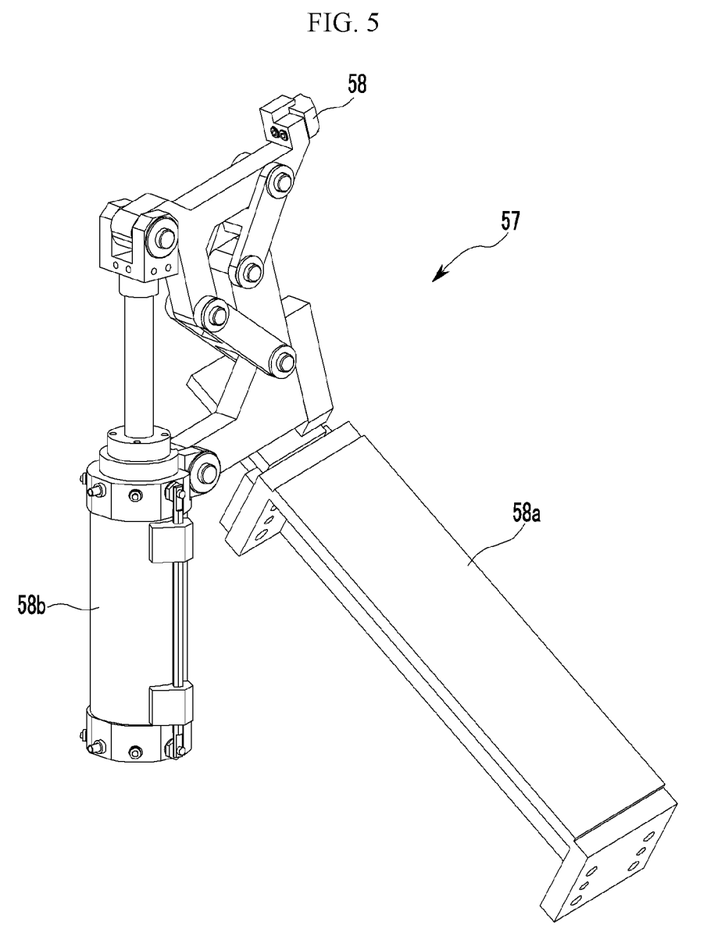
FIG. 5 is a perspective view of a hemming punch applicable to a roller hemming system for panels of a vehicle according to the first exemplary embodiment of the present invention.

As shown in FIG. 5, when a punch cylinder 58b, which is mounted through a second mounting body 58a, operates a punch block 58c, the hemming punch 57 hems the corner portion of the part 1 loaded on the die main body 52 by means of the punch block 58c.

In an exemplary embodiment of the present invention, the hemming robot 60, as shown in FIG. 1 and FIG. 2, is configured and arranged for hemming the edge portion of the part 1 loaded on the hemming die 50 through a roller hemming method.

According to an exemplary embodiment, a plurality of hemming robots 60 are provided and are disposed correspondingly to each hemming die 50.

The hemming robot 60 may be provided with a multi-joint arm, and a hemming roller unit 70 may be mounted at a front end of the arm (also referred to as a "roller hemming tool" in this art) for hemming the edge portion of the part 1.

Figure 6:
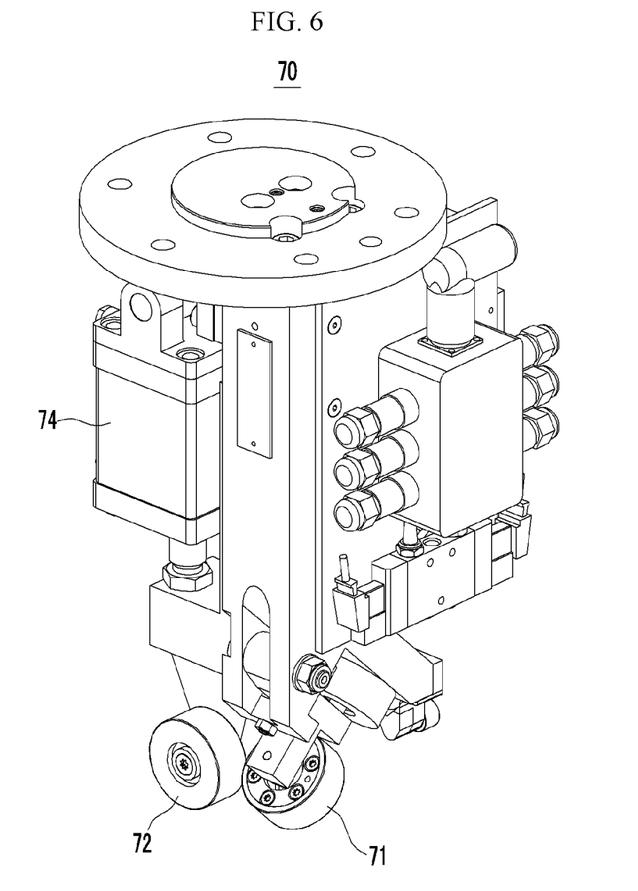
FIG. 6 is a perspective view of a hemming roller unit applicable to a roller hemming system for panels of a vehicle according to the first exemplary embodiment of the present invention.

FIG. 6 is a perspective view of a hemming roller unit applicable to a roller hemming system for panels of a vehicle according to the first exemplary embodiment of the present invention.

Referring to FIG. 6, the hemming roller unit 70 is adapted to hem the edge portion of the part 1 by means of twin rollers. Therefore, the hemming roller unit 70 includes a preceding roller 71 for pre-hemming the edge of the part 1 and a following roller 72 for hemming the edge of the part 1 thereafter.

The preceding roller 71 is rotatably mounted and is inclined at a predetermined angle with respect to a vertical line. The preceding roller 71 is adapted to apply force to the edge of the part 1 by operating force of the hemming robot 60.

The following roller 72 is also rotatably mounted and is inclined with respect to the preceding roller 71 by a predetermined angle. The following roller 72 is mounted so as to be movable upward or downward by a hemming cylinder 74, is adapted to apply force to the edge of the part 1 by operating force of the hemming cylinder 74.

In an exemplary embodiment of the present invention, the loading jig 80, as shown in FIG. 1 and FIG. 2, is adapted to load the part 1 that undergoes the hemming process.

The loading jig 80 may be an attachment device for positioning the parts 1 of various vehicle models having various specifications in an upright position.

A loading jig 80 is well known to a person skilled in the art, and thus a detailed description thereof will be omitted in this specification.

According to various embodiments, a second handling robot R2 is configured and arranged to load the part 1 onto the loading jig 80.

In particular, when the part 1 is clamped by an unloading pad 87 mounted at a front end of an arm of the second handling robot R2, the second handling robot R2 may be adapted to load the part 1 on the loading jig 80.

In an exemplary embodiment of the present invention, the hemming die exchanging unit 90, as shown in FIG. 1, is adapted to exchange the hemming dies 50 corresponding to the parts 1 of various vehicle models.

The hemming die exchanging unit 90 may include a turn table 91 for rotating the hemming die 50 to the transfer rail 40, and a third handling robot R3 may be provided for clamping and transferring the hemming die 50 to the turn table 91.

Hereinafter, operation of the roller hemming system 100 for panels of a vehicle according to the first exemplary embodiment of the present invention will be described in detail with reference to the accompanying drawings.

In an exemplary embodiment of the present invention, the part 1 (here, a tail gate is shown as the part 1), which includes the outer panel and the inner panel, are joined together and loaded on the marriage jig 10.

In addition, the clamping pad 20 corresponding to the part 1 of the corresponding vehicle model is mounted at the front end of the arm of the first handling robot R1 through the tool exchanger 21.

In particular, the first handling robot R1 can couple the clamping pad 20 positioned on the loading die 30 with the front end of the arm thereof through the tool exchanger 21.

Then, the first handling robot R1 moves the clamping pad 20 to the marriage jig 10, and the clamping pad 20 fixes the part 1 by means of the clamping means 23.

After that, the first handling robot R1 moves the clamping pad 20, which holds the part 1, to the hemming die 50.

In this process, the hemming die 50 corresponding to the part 1 of corresponding vehicle model may be moved from the predetermined position to the center of the cross on the transfer rail 40.

After the hemming die 50 corresponding to the part 1 of corresponding vehicle model is moved to the center of the cross on the transfer rail 40, the first handling robot R1 loads the part 1 on the die main body 52 of the hemming die 50 through the clamping pad 20.

In this process, the first pin clamper 27 of the die main body 52 may operate the clamping cylinder 28 so as to move the clamping pin 54, and the clamping pin 54 penetrates through the opening of the part 1 and is fitted into the clamping hole 29 of the clamping pad 20 so as to clamp the clamping pad 20.

Then, while the clamping pad 20 is locked by the die main body 52, the first handling robot R1 decouples the clamping pad 20 from the front end of the arm thereof.

After that, the edge portion of the part 1 loaded on the die main body 52 is temporarily clamped by the auxiliary clamper 56c by operating the plurality of auxiliary clamping means 55 mounted on the base member 51 of the hemming die 50 so as to position the part 1 upright on the die main body 52.

If the part 1 is positioned on the die main body 52, the corner portion of the part 1 is hemmed through the punch block 58c by operating the plurality of hemming punches 57 mounted on the base member 51 of the hemming die 50.

Simultaneously, the edge portion of the part 1 is hemmed by the hemming roller unit 70 mounted at the front end of the arm of the hemming robot 60.

In this embodiment, the hemming roller unit 70 hems the edge portion of the part 1 by using the twin rollers which include the preceding roller 71 and the following roller 72.

In particular, the edge portion of the part 1 is pre-hemmed by using the preceding roller 71 while the following roller 72 remains above the preceding roller 71. After that, the following roller 72 is moved downward and the edge portion of the part 1 is hemmed finally by using the following roller 72.

In this process, the hemming punch 57 hems the corner portion of the part 1 through the punch block 58*c*.

Therefore, a flange portion of the outer panel is bent toward a front end of the inner panel, and the edge portion of the part 1 can be hemmed by using the hemming roller unit 70 of the hemming robot 60.

If hemming of the part 1 is completed, the clamping pad 20 may be released from the die main body 52 by operating the first pin clamper 27 to thereby load the part 1 *d* on the loading die 30 through the first handling robot R1.

After that, the part 1 is clamped by the unloading pad 87 mounted at the front end of the arm of the second handling robot R2, and the clamped part 1 is loaded on the loading jig 80 by means of the second handling robot R2.

Therefore, the part 1 of the corresponding vehicle model can be quickly hemmed according to an exemplary embodiment of the present invention.

Hemming of another part 1 of the vehicle models can then be performed after the hemming die 50 corresponding to another part 1 is transferred to the center of the cross of the transfer rail 40.

In an exemplary embodiment of the present invention, four hemming dies 50 are used. Because one hemming die 50 is used for hemming one part 1, four different parts 1 can be hemmed according to this exemplary embodiment. If the number of different types of parts 1 is greater than four, the device can still be used. For example, four parts 1 can be sequentially hemmed by using four hemming dies 50 corresponding to four parts 1, and thereafter, the four hemming dies 50 can be replaced with further hemming dies 50 as needed by means of the hemming die exchanging unit 90.

The roller hemming system 100 for panels of a vehicle according to the described exemplary embodiment of the present invention can hem different parts very quickly by using twin rollers of the hemming robot, and can be used for hemming the parts of various vehicle models. Therefore, investment costs may be reduced.

Figure 7:
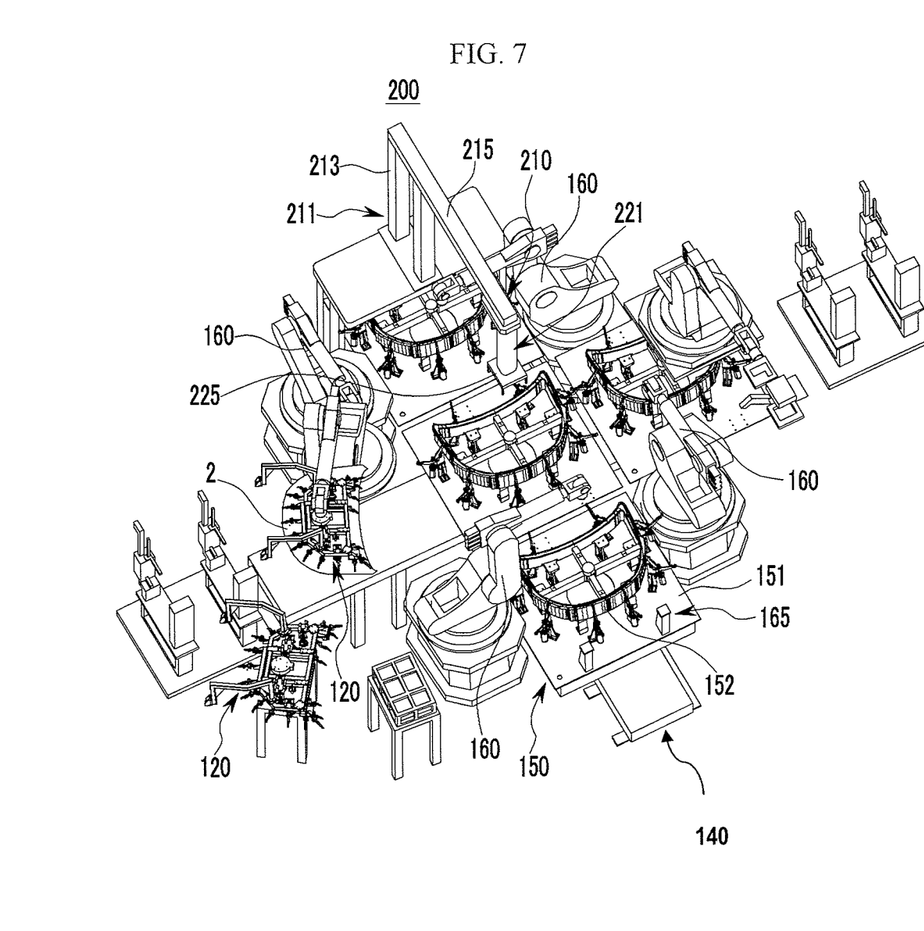
FIG. 7 is a schematic diagram of a roller hemming system for panels of a vehicle according to a second exemplary embodiment of the present invention.

FIG. 7 is a schematic diagram of a roller hemming system for panels of a vehicle according to a second exemplary embodiment of the present invention.

Referring to FIG. 7, a roller hemming system 200 for panels of a vehicle according to the second exemplary embodiment of the present invention is similar to the roller hemming system 100 according to the first exemplary embodiment, and can be used to hem a part 2 such as a hood.

Figure 8:
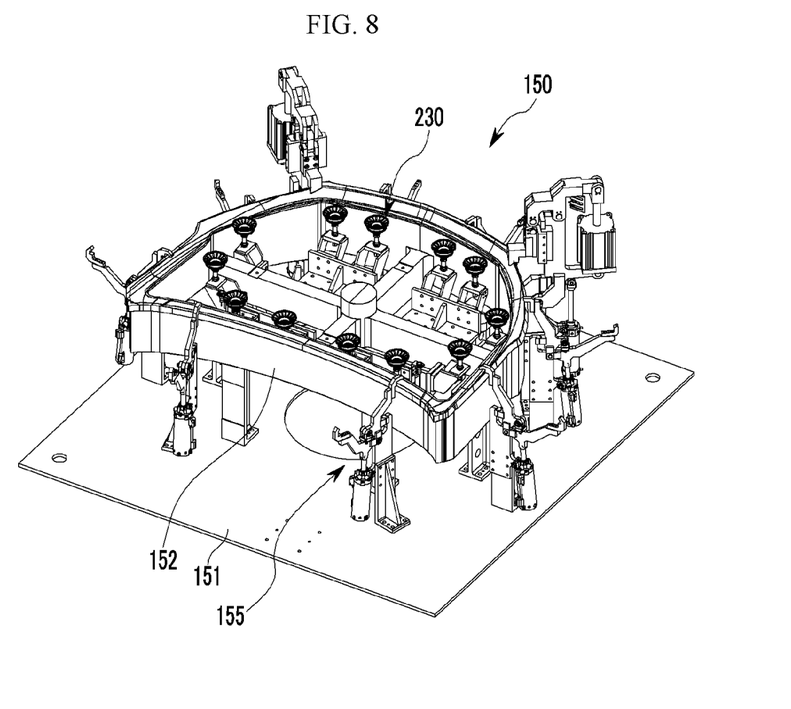
FIG. 8 is a perspective view of a hemming die applicable to a roller hemming system for panels of a vehicle according to the second exemplary embodiment of the present invention.

In a case that the part 2 is the hood, a pair of second pin clampers 165 may be mounted on the base member 151 of the hemming die 150, as shown in FIG. 7 and FIG. 8. The pair of second pin clampers 165 may be adapted to clamp the clamping pad 120 by using a pin operated by a cylinder.

Figure 9:
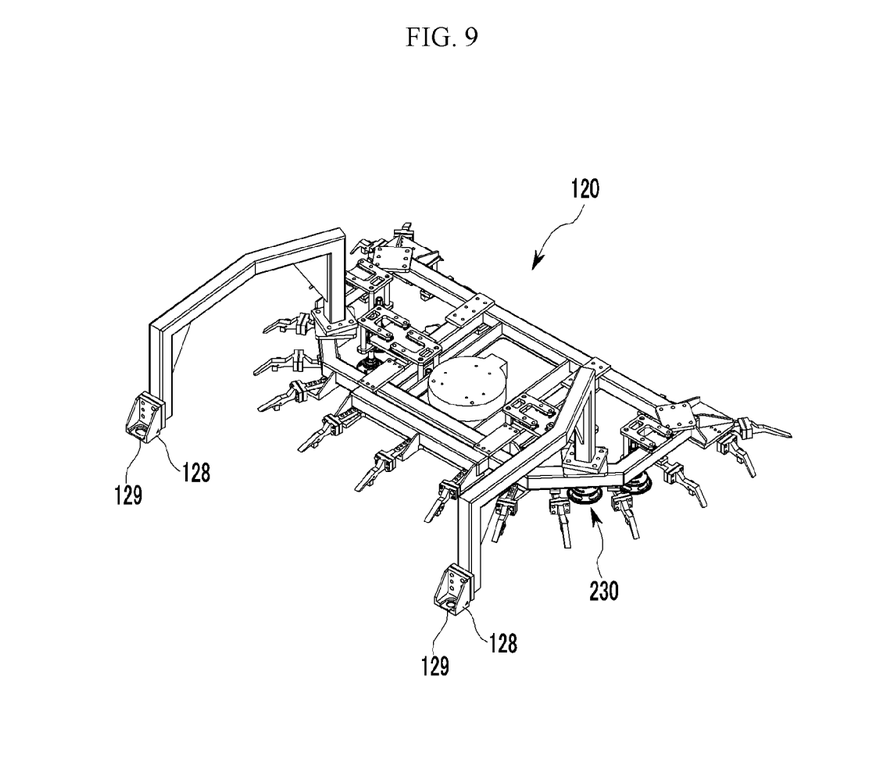
FIG. 9 is a perspective view of a clamping pad applicable to a roller hemming system for panels of a vehicle according to the second exemplary embodiment of the present invention.

As shown in FIG. 9, a clamped end 128 may integrally protrude from the clamping pad 120. A clamping hole 129 in which a pin of the second pin clamper 165 may be fitted is formed at the clamped end 128.

The second pin clamper 165 is well known to a person skilled in the art, and thus a detailed description thereof will be omitted in this specification.

As shown in FIG. 7 to FIG. 9, the second exemplary embodiment of the present invention further includes a pressing unit 210 and a suction unit 230. The pressing unit 210 and the suction unit 230 can secure clamping force the outer panel and the inner panel of the part 2. In particular, after the part 2 is aligned by means of the auxiliary clamping means 155 of the hemming die 150, the pressing unit 210 and the suction unit 230 may be used when the part 2 is hemmed through the hemming robot 160.

In particular, the pressing unit 210 may be configured to apply pressure above the center of the cross of the transfer rail 140 to the inner panel of the part 2 loaded on the die main body 152 of the hemming die 150.

Figure 10:
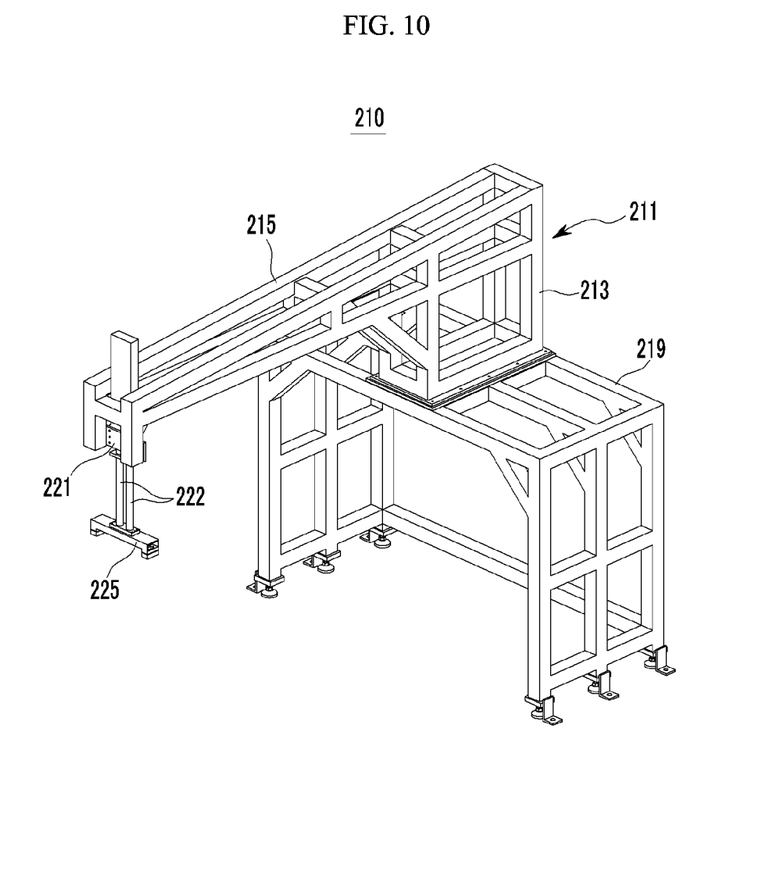
FIG. 10 is a perspective view of a pressing unit applicable to a roller hemming system for panels of a vehicle according to the second exemplary embodiment of the present invention.

The pressing unit 210, as shown in FIG. 10, is provided on the base frame 219 and includes a post 211, an operating cylinder 221, and a pressing pad 225.

As shown, the post 211 includes a vertical frame 213 mounted vertically on the base frame 219 of the workroom and a horizontal frame 215 connected to an upper end of the vertical frame 213, and extends toward an above of the center of the cross of the transfer rail 140.

As further shown, the operating cylinder 221 is mounted at an end of the horizontal frame 215 in a downward direction toward the center of the cross of the transfer rail 140.

In addition, the pressing pad 225 is adapted to apply pressure to the part 2 on the die main body 152 and is mounted at the operating rod 222 of the operating cylinder 221.

The suction unit 230, as shown in FIG. 8 and FIG. 9, is adapted to apply suction and catch/secure the inner panel and the outer panel of the part 2 loaded on the hemming die 150 by means of vacuum pressure.

The suction unit 230 may include a pair of vacuum cups mounted at the clamping pad 120 and the die main body 152, and may apply suction to the inner panel and the outer panel of the part 2 by vacuum pressure to thereby fix a position of the part 2.

A plurality of suction units 230 may be mounted along an edge of the clamping pad 120 so as to suction and catch/hold the inner panel of the part 2 by vacuum pressure. Further suction units 230 may be mounted at an inner surface of the die main body 152 so as to suction and catch/hold the outer panel of the part by vacuum pressure.

Therefore, the roller hemming system 200 for panels of a vehicle according to the second exemplary embodiment of the present invention can fix the clamping pad 120 to the die main body 152 by means of the second pin clamper 165 when the part 2 is loaded on the die main body 152 by using the clamping pad 120 of the first handling robot R1.

In particular, the suction unit 230 applies suctions to the inner panel and the outer panel of the part 2 by vacuum pressure and fixes/holds the part 2.

After that, when the operating rod 222 moves downward by the operating cylinder 221, the pressing pad 225 of the pressing unit 210 is located above the part 2 and applies pressure to the inner panel of the part 2.

According to the second exemplary embodiment of the present invention, a clamping force to the outer panel and the inner panel of the part 2 can be secured by applying pressure to the part 2 through the pressing unit 210 and suctioning and catching/holding the part 2 through the suction unit 230 while the part 2 is hemmed through the hemming robot 160.

Other components and functions of the roller hemming system 200 according to the second exemplary embodiment of the present invention that have not been specifically described in connection with the second exemplary embodiment may be the same as those according to the first exemplary embodiment. Therefore, a detailed description will be omitted.

The exemplary embodiments of the present invention can hem different parts of various vehicle models very quickly by using twin rollers of the hemming robot, can secure a clamping force of the outer panel and the inner panel of the part, and can be used for hemming the parts of various vehicle models. Therefore, investment costs may beneficially be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A roller hemming system for panels of a vehicle, comprising:
    a marriage jig adapted to load thereon a part having an outer panel and an inner panel joined together;
    a clamping pad releasably mounted at a front end of an arm of a first handling robot, and adapted to clamp the part loaded on the marriage jig by a plurality of clamping means;
    a plurality of transfer rails adapted to intersect with each other at a center, the plurality of transfer rails corresponding to various parts of various vehicle models having different specifications;
    a plurality of hemming dies, each hemming die being disposed on a predetermined transfer rail, being adapted to reciprocate on the transfer rail between the center and an initial position, and being adapted to receive thereon the part clamped by the clamping pad; and
    a plurality of hemming robots, each hemming robot being disposed so as to correspond to each hemming die, and being provided with a hemming roller unit adapted to hem an edge of the part.

2. The roller hemming system of claim 1, further comprising a loading jig adapted to load the part thereon by a second handling robot after the part has been hemmed by the hemming roller unit of the hemming robot.

3. The roller hemming system of claim 1, further comprising a plurality of loading dies, each loading die being adapted to load thereon the clamping pad.

4. The roller hemming system of claim 1, further comprising an exchanging unit for exchanging the plurality of hemming dies.

5. The roller hemming system of claim 1, wherein each of the hemming dies comprise:
    a base member movably mounted on the transfer rail; and
    a die main body mounted on the base member.

6. The roller hemming system of claim 5, wherein, when the part is a tail gate, a pair of first pin clampers for clamping the clamping pad is mounted at the die main body.

7. The roller hemming system of claim 5, wherein, when the part is a hood, a pair of second pin clampers for clamping the clamping pad is mounted on the base member.

8. The roller hemming system of claim 7, further comprising a pressing unit adapted to press the part down when an edge of the hood is hemmed.

9. The roller hemming system of claim 8, wherein the pressing unit comprises:
    a post mounted erectly and extending toward the center of the transfer rail;
    an operating cylinder mounted downward at an end of the post toward the center of the transfer rail and provided with an operating rod movably mounted at the operating cylinder; and
    a pressing pad mounted at the operating rod of the operating cylinder and adapted to press the part down.

10. The roller hemming system of claim 5, further comprising a plurality of auxiliary clamping means mounted on the base member and adapted to clamp the part loaded on the die main body temporarily and to position the part upright.

11. The roller hemming system of claim 10, further comprising a plurality of hemming punches mounted on the base member and adapted to hem a corner portion of the part.

12. The roller hemming system of claim 1, further comprising a plurality of suction units mounted at the clamping pad and the hemming die and adapted to apply suction to the part by using vacuum pressure.

13. The roller hemming system of claim 1, wherein the hemming roller unit comprises:
    a preceding roller adapted to pre-hem the edge of the part; and
    a following roller mounted corresponding to the preceding roller so as to be movable upward and/or downward and adapted to finally hem the edge of the part.

* * * * *